Patented July 19, 1938

2,124,372

UNITED STATES PATENT OFFICE 2,124,372

STARCH

Carl C. Kesler, Cedar Rapids, Iowa, assignor to Penick & Ford, Ltd., Incorporated, a corporation of Delaware No Drawing. Application May 4, 1936, Serial No. 77,863

4 Claims. (Cl. 127—33)

This invention relates to starch, and more particularly to a cooked, or partially cooked, starch, which has been heated in the presence of certain disintegration-inhibitors, and has thereby acquired new properties which adapt it especially for certain uses.

An object of the invention is to provide a new starch product having characteristics which will be described fully hereinafter, and a method for preparing the starch. Other specific objects and advantages will appear as the specification proceeds.

I have discovered that when starch is heated with water in the presence of certain inhibitors, and to certain temperatures, the heating being discontinued after the desired temperatures have been reached, the starch granules become swollen or distended to the point that the crosses thereof disappear when observed with crossed Nicols, while, at the same time, the bulk of the granules remain as individual or non-disintegrated granules. The granules do have, however, a slight or incipient gelatinization making them capable of a limited bonding action. Under the microscope, the granules appear to be greatly swollen and apparently the beta amylose or inner portion of the granule has swollen along with the alpha amylose and stretched the granule to, or near, its bursting point. The swollen granules have the new property of remaining suspended in concentrations at which an ordinary starch suspension would settle out. When the granules are heated with water in high concentrations, they become somewhat crumbly as the critical temperature is reached, and may be readily dried by means of the ordinary drying equipment employed in starch plants for drying uncooked or unmodified starch. The dried starch may be ground in a mill to form a mealy, non-lustrous, fine powder.

To produce the above described product, I have found the following method satisfactory. Starch is added to water in any suitable concentration, say, for example, a fifty percent concentration. A rather high concentration has the advantage, in that an extensive evaporation is not necessary when the product is later dried and a smaller amount of inhibitor is required.

To prevent disintegration of the starch granules during the heating operation and while the granules are swelling, I add a suitable inhibitor. Various inhibitors, suitable for preventing the premature breaking up of the starch granules at gelatinizing temperatures, may be employed. For example, soaps, such as sodium salts of the acids obtained from fats and vegetable oils may be employed. Also, sulphonated tallows, soluble oils (sulphonated vegetable oils), and sulphonated alcohols, may be used. Other equivalents may obviously be used.

The amounts of the inhibitors added will, of course, vary with the type of inhibitor employed. For example, with soaps, we have found that percentages varying from one percent to thirty percent, and higher, may be used. Greater difficulty is experienced in obtaining the desired product when only one percent is employed. With two percent, we have obtained good results. Percentages varying from ten to thirty percent may be undesirable because of the large amount of soap left in the finished product.

The proper percentage of the inhibitor can be readily determined by observing the character of the product during the heating operation.

The amount of inhibitor, the temperature to which the material is heated, and the concentration, are all inter-related, and a variation in one will be found to require changes in the other conditions.

The temperature of the starch should be raised until the granules have swollen and become enlarged, so that their crosses have disappeared, while, at the same time, the great bulk of the granules remain as individual or non-disintegrated granules. It will ordinarily be necessary to heat the material to the temperature required to gelatinize the particular type of starch used, such complete gelatinization, however, being prevented in this instance by the presence of the inhibitor. As soon as the granules have lost their crosses, while still remaining as individual granules, I discontinue the heating and recover the product for use. The product may be used in its wet state, or it may be dried and re-used by wetting it with water.

It will be noted that in the practice of my invention, the heating and treatment of the starch is discontinued before the bulk of the granules disintegrates, for when the latter condition occurs, the starch becomes substantially gelatinized and does not have the characteristics and properties of my above-mentioned product. Such gelatinized starch cannot be dried in ordinary drying equipment used in starch factories for drying unmodified starch.

A specific example of my new method may be given as follows:

To a fifty percent cornstarch and water concentration, is added three percent of commercial flake soap (sodium stearate, oleate, palmitate, etc.). The temperature of the mass is raised to from 170° to 190° F. and preferably to 185° F. In the specific apparatus employed, it required about two hours to reach this temperature. When the above temperature was reached, the product had the desired characteristics already described and heating was discontinued.

In the specific illustration given, I found that the product was, unlike ordinary or unmodified cooked starch, very well adapted for drying in ordinary equipment. The product was dried in a vacuum dryer, although it could have been dried satisfactorily in kilns, etc.

For tapioca starch, I heat from 160° to 180° F. and preferably to 180° F.

It will be understood that the above specific example is applicable to a specific starch. When different starches are treated, it will be obvious to others skilled in the art that changes should be made in the conditions.

The new starch product is useful in the making of paper, in textile sizing, as a basic material for the manufacture of derivatives such as explosives, various esters, laundry starch, and for numerous other uses. The starch product is adapted for a multitude of new uses by virtue of its physical structure and new characteristics.

The foregoing detailed description has been given for clearness of understanding only, and no unnecessary limitations should be understood therefrom, but the appended claims should be construed as broadly as permissible, in view of the prior art.

I claim:
1. The method of forming a starch product, comprising: heating, in water, raw starch in the presence of a disintegration-inhibitor to a temperature sufficient to distend the granules until their crosses disappear when observed with crossed Nicols, and discontinuing said heating before the bulk of said granules have disintegrated.

2. The method of forming a dry starch product, comprising: heating, in water, starch granules in the presence of a disintegration-inhibitor until the crosses of said granules have disappeared as observed through crossed Nicols, but discontinuing said heating before substantial disintegration of the granules occurs, and drying the granules.

3. A starch product which in dried form consists of somewhat enlarged granules, the crosses of which have disappeared as observed through crossed Nicols, and which upon wetting swell to substantially enlarged granules, this product in ground form and suspended having the property of remaining suspended in concentrations at which unmodified starch granules would settle out.

4. Starch consisting of a mass of enlarged granules, the crosses of which have disappeared, as observed through crossed Nicols, the bulk of said granules remaining as individual granules.

CARL C. KESLER.